2,803,582

LOCAL ANESTHETIC COMPOSITION

Leonid S. Cherney, San Francisco, Calif.

No Drawing. Application July 16, 1956,
Serial No. 597,848

3 Claims. (Cl. 167—52)

This application is a continuation-in-part of my application Serial No. 340,903, filed March 6, 1953, now abandoned.

This invention relates to a long-acting local anesthetic. Local anesthetics are well-known and are ordinarily administered by injection. The action of these anesthetics is quite rapid, but the effect is of relatively short duration for the reason that the anesthetic is soon diluted by the blood and/or is converted into inactive materials through metabolism. Under many clinical conditions, it would be highly advantageous to have a local anesthetic that would act over many hours or even days, so that a local portion of the body could be relieved of pain for an extended period of time. For instance, following operations, a long-lasting anesthetic is highly advantageous in that it greatly increases the comfort of the patient during healing. In the case of accidents, a long-lasting anesthetic would do much to relieve suffering. Further, such anesthetics are desirable for the relief of painful conditions such as bursitis.

It is therefore the object of the present invention to provide a non-toxic, long-lasting, local anesthetic. Still another object of this invention is to provide a local long-lasting anesthetic in the form of a powder which can be sprinkled into a wound or operation site, and which will be effective during the entire period of healing.

Still another object of this invention is to provide an anesthetic which may be injected into an animal body and which will provide a local anesthetic action for a long period of time.

In the Eisleb patent, 1,889,645, the inventor describes the water soluble salts, such as the monochloride, of the beta-dimethylaminoethyl ester of para-butylaminobenzoic acid. This compound is known under the names of pontocaine, tetracaine, and pantocaine. For convenience, the base compound is referred to as pontocaine throughout the balance of the specification.

I have discovered that the monohydroiodide salt of pontocaine may be readily prepared and that this novel compound may be used per se as a long-lasting local anesthetic. I have further discovered that pontocaine hydroiodide may be coated with other compounds of a very slowly dissolving nature, to render it even more long-acting. Therefore, as will presently appear, a local anesthetic is provided with an effect which will last for several days rather than a few hours, heretofore experienced with local anesthetics.

Pontocaine hydroiodide can be easily prepared from pontocaine hydrochloride by mixing the latter with potassium iodide. The pontocaine hydroiodide is very insoluble and precipitates out of the reaction solution. Preferably, a saturated solution at about 40° C. of pontocaine hydrochloride is prepared and a second solution at the same temperature and containing an equivalent amount of potassium iodide is prepared. The two solutions are mixed and cooled to room temperature. The hydroiodide is a white crystalline material; the solubility in water is 0.8% at 40° C., 0.5% at 25° C. and 0.47% at room temperature (20° C.). The low solubility is particularly surprising since the solubility of procaine hydroiodide is 10% at room temperature.

If the pontocaine hydroiodide is to be used per se, it is preferred that it be crystallized to form fairly large crystals, which can be done as follows:

From 16 to 18 milliequivalents (me.) of pontocaine hydroiodide was dissolved in a total volume of 100 cc. of water at an initial temperature of 80° C. The solution was allowed to cool by exposure to room temperature with occasional shaking. As the solution cooled to room temperature, crystals were obtained. The heat exchange in preparing these crystals was very slow so that from one-half to two hours was required for the solution to come down to room temperature. The crystals were long, prismatic, colorless needles of widely different sizes, ranging from a fraction of a millimeter to several millimeters in length. The individual width was rarely above 40 microns. Yield 80–85%.

Although pontocaine hydroiodide by itself forms a very effective, long-lasting local anesthetic and is suitable for many uses, it may be desired that the action be even slower. This may be accomplished by coating the crystals with a substance which slows down the rate of solution, such as aluminum monostearate. The aluminum stearate then may be mixed with a suitable solvent and ground in a mortar with pontocaine hydroiodide. The original crystals, as prepared above, had a solubility rate of 5 to 6 (expressed in terms of milligrams) of pontocaine hydroiodide per 100 millimeters of water per hour and when such crystals were placed in a mortar with 2% or 5% aluminum monostearate which had been dissolved in a small amount of chloroform and then dried, the solubility was the same as that of the original crystals. However, the coated material was in the form of a very finely divided powder as contrasted with the relatively large crystals used as the starting material. The solubility rate was substantially the same whether 2% or 5% aluminum monostearate was employed. Other solvents were used and found to be successful, such as ethyl alcohol. Any solvent may be used which does not react with either pontocaine hydroiodide or aluminum monostearate. Instead of aluminum monostearate, one can use aluminum di- or tristearates or the stearates of zirconium or germanium.

If one heats the mixture to a temperature of about 100–120° C. for thirty minutes, the solubility rate of the resulting substances can be reduced to about 3 to 4 milligrams per 100 millimeters of water per hour. This yielded the most satisfactory coated product. To prepare this product, one takes 400 mgs. of pontocaine hydroiodide crystals and 12 mgs. of aluminium monostearate, partially dissolved in 4 cc. of 95% ethyl alcohol. The aluminium monostearte is partially dissolved in 3–4 cc. of ethyl alcohol by warming the mixture to its boiling point, and the mixture is then poured over the pontocaine hydroiodide crystals in a mortar. The mixture is carefully mixed and ground until the solvent has disappeared. Then the mixture is heated to a temperature of about 100–120° C. for thirty minutes with occasional remixing and regrinding. The preparation obtained in this manner showed a solubility rate of 3–4 mg. per 100 ml. of water per hour at 25° C. Under these conditions, it was found that 0.5 gram of pontocaine hydroiodide required from 125 to 167 hours to dissolve. This is the manner of making the coated product used on the clinical studies.

Obviously, the compounds of the present invention should not be placed in solution before injection since only a very dilute solution could be prepared and this would destroy the long-lasting effect desired. However, the uncoated material may be dispersed in a liquid, such as water, and the dispersion introduced, or either the coated or uncoated material may be sprinkled into a wound or operation site in finely divided form. Dispersions are quite easily prepared by placing the desired quantity of water and crystals in a vessel and then drawing the mixture in and out of a syringe a few times. Injection should follow immediately. A number of clinical studies have been made on human subjects utilizing both the coated and the uncoated material.

I claim:

1. As a new composition of matter the hydroiodide of the beta-dimethylaminoethyl ester of parabutylaminobenzoic acid.

2. As a new composition of matter finely divided particles of the hydroiodide of the beta-dimethylaminoethyl ester of parabutylaminobenzoic acid coated with a metal stearate wherein said metal is selected from the group consisting of aluminum, germanium and zirconium.

3. As a new composition of matter, ground crystals of hydroiodide of the beta-dimethylaminoethyl ester of parabutylaminobenzoic acid coated with aluminum stearate, the aluminum stearate constituting from about 2% to about 5% of the total composition and the said hydroiodide constituting from about 95% to about 98% of the total composition.

References Cited in the file of this patent

UNITED STATES PATENTS

| | | |
|---|---|---|
| 1,889,645 | Eisler | Nov. 29, 1932 |
| 2,363,082 | Ringk | Nov. 21, 1944 |
| 2,363,083 | Ringk | Nov. 21, 1944 |